G. H. WEBSTER.
COUPLINGS FOR LEAD PIPES.
No. 190,651. Patented May 8, 1877.
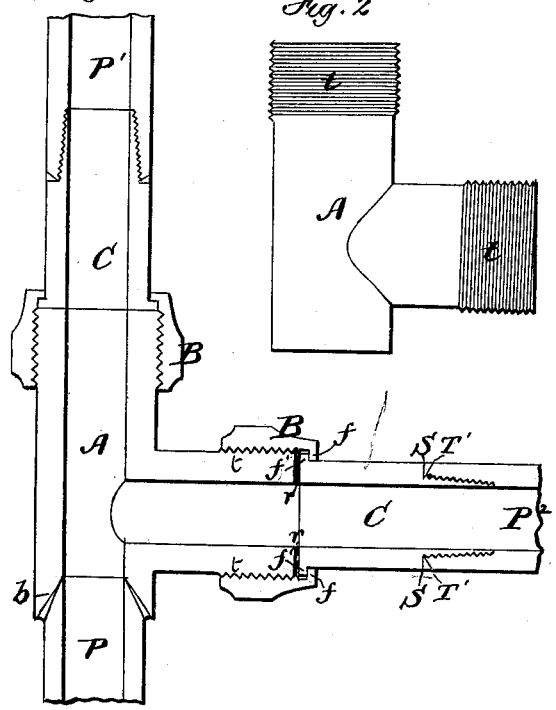
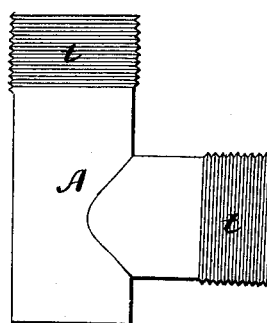
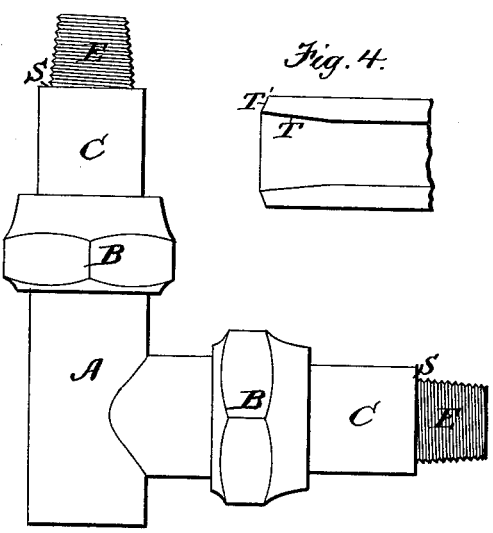
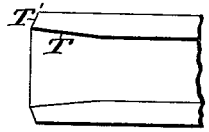
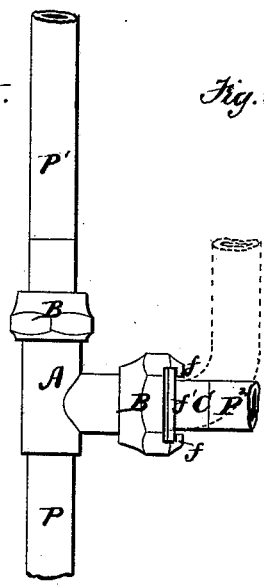
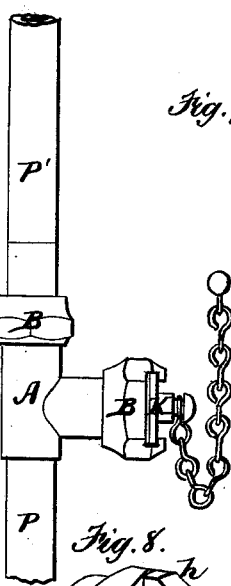
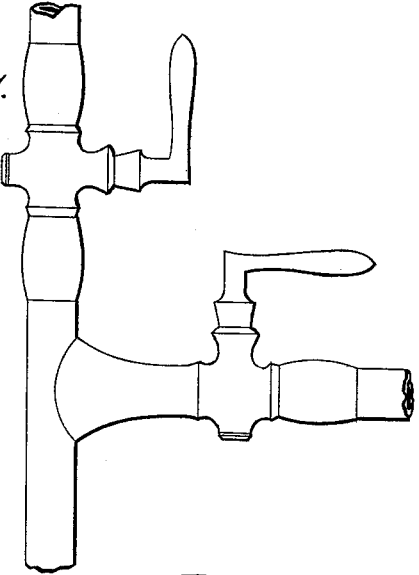
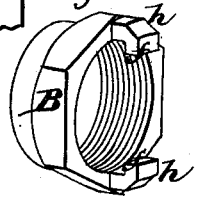
Witnesses.
S. S. Storton
W. E. Brown
Inventor
George H. Webster
by his Attys
Carroll D. Wright & Brown
N. PETERS, PHOTO-LITHOGRAPHER, WASHINGTON, D. C.

UNITED STATES PATENT OFFICE.

GEORGE H. WEBSTER, OF BOSTON, MASSACHUSETTS.

IMPROVEMENT IN COUPLINGS FOR LEAD PIPES.

Specification forming part of Letters Patent No. 190,651, dated May 8, 1877; application filed February 28, 1877.

*To all whom it may concern:*

Be it known that I, GEORGE H. WEBSTER, of Boston, in the county of Suffolk and State of Massachusetts, have invented certain Improvements in Coupling for Lead Pipes, of which the following is a specification:

In the accompanying drawing, forming a part of this specification, Figure 1 represents a vertical section of my improvement. Fig. 2 represents a side view of a portion thereof. Fig. 3 represents a side view with the lead pipes detached. Fig. 4 represents a sectional view of the end of a length of lead pipe. Fig. 5 represents a side elevation, showing the lead pipes attached. Fig. 6 represents a similar view, showing the branch or lateral pipe disconnected. Fig. 7 represents a side elevation, showing the ordinary method of applying a lateral pipe, and Fig. 8 represents an improved coupling-nut.

This invention has for its object, first, to provide a T joint or coupling adapted to connect sections of lead pipe where a branch enters a main pipe, in such manner that the sections can be disconnected from the joint or coupling without injury; secondly, to provide improved means for connecting lead pipes to hard-metal pipes or sections; thirdly, to provide an improved coupling-nut for connecting a detachable pipe-section to a threaded pipe-section, onto which the nut is screwed.

To these ends my invention consists in the several improvements, which I will now proceed to describe, and point out in my claims.

In carrying out my invention I employ a T-joint, A, of hard metal. On two of the ends of the joint A I form external screw-threads $t\ t$. The other end of the joint A I adapt for permanent attachment to a section of lead pipe, preferably by beveling its interior at $b$, the pipe being subsequently attached by soldering, as will presently appear. B B represent nuts, which are adapted to be screwed onto the threaded ends of the joint A. The outer ends of the nuts B have inwardly-projecting flanges $f$. C C represent coupling-sections, which are adapted to be secured to the joint A by the nuts B, so as to form continuations of the main portion and of the branch of said joint, as shown, the inner ends of the sections C being provided with flanges $f'$, which are engaged and held by the flanges $f$ of the nuts B, as shown in Fig. 1. The outer ends of the sections C are reduced in size, so as to form shoulders S. The reduced portions E of the sections C are tapered and provided with screw threads. P P¹ represent the ends of sections of lead pipe, which, in connection with the body of the joint A, constitute a continuous pipe, and P² represents the end of a section of lead pipe, which, in connection with the branch of the joint A, constitutes the lateral pipe. The pipe P is attached directly to the joint A, its end being beveled externally, introduced into the beveled end of the joint, and soldered therein; or it may be attached otherwise, if desired. The pipes P¹ and P² are attached to the sections C C, and, preparatory to such attachment, the pipes are beveled internally, as shown at T, to correspond with the external bevel of the threaded ends of the sections, and are also beveled on their ends, as shown at T'. The internal bevels T of the pipes are somewhat less in diameter than the threaded portions E of the sections C. The attachment of the pipes P¹ P² to the sections C is effected by screwing the latter into the beveled portions T of the pipes until the ends of the pipes abut against the shoulders S of the sections, the threads of the sections cutting into the soft material of the pipes, and thus making tight joints. The beveled ends T' of the pipes, in connection with the shoulders S of the sections, form V-shaped annular grooves, which are filled with solder in any suitable manner, the solder insuring strength and tightness at the joints. When it is desirable to disconnect the lateral pipe P² it is only necessary to unscrew the nut B, which holds the section C, to which it is attached, and swing the pipe to one side. When the pipe is thus disconnected a cap, K, is applied in its place, as shown in Fig. 6, this cap being preferably suspended by a chain from a convenient support close at hand.

This device constitutes a very simple and convenient means for detachably connecting a lateral pipe to a continuous pipe. Heretofore it has been the usual practice of plumbers to connect lateral pipes by means of a "wipe-joint," as shown in Fig. 7, the lateral pipe being soldered permanently to the continuous pipe, so that it can only be disconnected by cutting it off. This method requires the use of two stop-cocks at every joint, as shown, for shutting off the water. By my improvement the lateral pipe can be detached at will without injury, the cap K taking the place of a stop-cock when the pipe is detached. The section P¹ of the continuous pipe can be similarly detached, if desired. By providing the ends of the sections C with the shoulders S and tapered threaded portions E, I am enabled to connect the lead pipes very readily and securely to the section C without wipe-joints, thus avoiding the enlargement of the lead pipe where it is joined and the use of a large amount of solder.

It is well known that it is often necessary to disconnect branch pipes from the main pipe when obstructions occur, caused by the formation of ice or the accumulation of solid matter, the latter being especially liable to occur at the junction of two waste-pipes of sinks, the branch waste-pipe being curved just before it is joined to the main pipe, as shown in dotted lines in Fig. 5. The fact being borne in mind that heretofore in case of such obstructions it has always been necessary to cut the branch pipe in order to disconnect it, the advantages of my improvement, which enables the branch pipe to be disconnected and swung to one side without the slightest injury, will be readily seen.

I prefer to make the nuts B in the form shown in Figs. 5, 6, and 8—that is to say, with the flanged ends cut away, so as to form two hooks, $h\ h$, located at diametrically opposite points. The inwardly projecting portions of the hooks form sectional flanges $f$, which hold the flanges $f'$ of the sections C. This form of nut enables the sections C to be connected to the T-joint A by introducing the flanges $f'$ between the hooks $h$, and turning the nuts B enough to bind or clamp the sections firmly against the ends of the joint, a leather or other packing-ring, $r$, being preferably interposed between the sections and the joint. The connection and detachment of the sections C is thus more quickly effected than when the flanges $f$ are made to extend entirely around the nut B, the nut, when made in the last-mentioned form, having to be entirely unscrewed from the joint A to detach the sections C, thus involving more time and labor, both in attaching and detaching the sections, than is involved by the use of the hooked nut. The improved nut enables me to use a flat disk for the cap K, the hooks $h$ holding the cap in the same manner that they hold the flanges $f'$. The nut is more easily tightened than when the flange $f$ is continuous, there being less friction.

I do not limit myself to making the threaded ends of the coupling-sections C tapering in form, as they may be of uniform diameter, if desired, without departing from the spirit of my invention. Neither do I limit myself to the described method of connecting the lead pipe to the sections C, as the ordinary method of attachment by wipe-joints, or any suitable method, may be employed.

It is very obvious that my several improvements may be employed in connection with other pipes than those made of lead, and that the hooked nuts B may be employed for coupling sections of pipe of any desired length or material.

I claim as my invention—

1. The T-joint A, having external threads $t\ t$, combined with the flanged nuts B and the flanged coupling-sections C, the latter being adapted to be permanently connected to the lead pipe, as set forth.

2. The coupling-sections C, having the shoulders S and tapering threaded portions E, combined with the lead pipes P¹ P², having the bevels T T', as set forth.

3. As a new article of manufacture, a branch coupling for lead pipe, composed of the T-joint A, having external threads $t\ t$, the flanged nuts B B, and the flanged sections C C, having shoulders S and tapering threaded portions E, as set forth.

4. A coupling-nut, B, having hooks $h\ h$, combined with a threaded pipe or section, onto which said nut is screwed, and a detachable pipe or section, C, having a flange on its end, (or a cap, K, having substantially the same diameter as said flange,) which flange (or cap) is adapted to be inserted between the hooks $h$ by a lateral movement, and, when so inserted, is adapted to be clamped tightly against the end of the threaded pipe or section, or against an interposed packing-ring, by turning the nut B, as set forth.

In testimony whereof I have signed my name to this specification in the presence of two subscribing witnesses.

GEO. H. WEBSTER.

Witnesses:
L. F. TORREY,
HENRY G. ROBBINS.